United States Patent [19]

Lanoye et al.

[11] Patent Number: 5,684,089
[45] Date of Patent: Nov. 4, 1997

[54] PREGELLABLE ADHESIVES

[75] Inventors: Thierry Lanoye, Cosne-sur-Loire; Anne-Marie Garnault, Les Babises, both of France

[73] Assignee: Henkel Kommanditgesellschaft auf Aktien, Duesseldorf, Germany

[21] Appl. No.: 768,015

[22] Filed: Dec. 13, 1996

Related U.S. Application Data

[62] Division of Ser. No. 389,035, Aug. 3, 1989.

[30] Foreign Application Priority Data

Aug. 5, 1988 [FR] France ................... 88 10636

[51] Int. Cl.$^6$ ................... C08L 23/18; C08L 23/30
[52] U.S. Cl. ................... 525/237; 525/71; 525/74; 525/78; 525/84; 525/165; 525/171; 525/176; 525/178; 525/183; 525/184; 525/194; 525/221; 525/231; 525/232; 525/233; 525/236; 525/332.5; 525/332.6; 525/333.2; 525/343
[58] Field of Search ................... 525/71, 74, 78, 525/84, 165, 171, 176, 178, 183, 184, 194, 221, 231, 232, 233, 236, 237, 332.5, 332.6, 333.2, 343

[56] References Cited

U.S. PATENT DOCUMENTS

| | | | |
|---|---|---|---|
| 2,921,043 | 1/1960 | Uraneck | 260/45.5 |
| 4,661,554 | 4/1987 | Coran et al. | 524/504 |
| 4,824,512 | 4/1989 | Kohlstadt | 156/334 |

FOREIGN PATENT DOCUMENTS 0181441  5/1986  European Pat. Off. .

*Primary Examiner*—W. Robinson H. Clark
*Attorney, Agent, or Firm*—Ernest G. Szoke; Wayne C. Jaeschke; Henry E. Millson, Jr.

[57] ABSTRACT

A pregellable adhesive containing several polymers, of which at least one is olefinically unsaturated and the other capable of curing by esterification, prepared in such a way that it cures by two different chemical reaction mechanisms which can be activated successively and catalyzed at least substantially independently of one another.

15 Claims, No Drawings

PREGELLABLE ADHESIVES

This application is a divisional application of application Ser. No. 07/389,035, filed Aug. 3, 1989.

BACKGROUND OF THE INVENTION

1. Field of the Invention

This invention relates to an adhesives which cure by two different, successively activatable chemical reactions. More particularly, the invention relates to adhesives based on mixtures of two polymers which can be joined together by an esterification reaction or the like; the mixture may additionally be vulcanized after the esterification reaction. The adhesives are especially useful for vehicle construction applications.

2. Description of the Related Art

In vehicle construction, it is desirable to harden adhesives together with the paints at relatively high temperatures. However, since painting has to be preceded by cleaning operations after which bonding is no longer possible, the adhesives used have to develop such high strength only a short time after application that the bonds neither separate nor slip during cleaning of the bodywork to be painted.

To achieve this, many different types of adhesive have already been proposed for this application. For example, it is possible to obtain adequate early strength with two-component polyurethane adhesives. However, the disadvantage is that the cured polyurethane adhesives are difficult to stabilize against hydrolysis or similar ageing processes. Another disadvantage is that the two components, namely polydiisocyanates and polyols, have to be used in exact quantitative ratios because otherwise bond failures occur. This is all the more difficult in practice as the two components generally differ in viscosity so that accurate dosing and mixing units have to be used. The same also applies to two-component epoxy resin systems.

Other adhesives typically used in the field in question are the plastisols. Plastisols are mixtures of polymers with a solvent in which polymer and solvent are coordinated with one another in such a way that a dispersion of a polymer in the organic solvent is present at room temperature and a dissolving process takes place on heating so that, ultimately, a polymer is present in swollen form. The disadvantage of plastisols lies in the poor variability of the systems, which means that the polymers can only be adapted to meet bonding requirements providing the solubility properties important to gellability are not lost as a result. Another disadvantage is that plastisols have to be cured in induction ovens or the like before stoving of the paint which involves additional energy consumption.

Epoxy resin adhesives formulated in the manner of plastisols are known. With systems such as these, however, it is extremely difficult to adjust reactivity in such a way that stability in storage on the one hand and reactivity in induction ovens on the other hand are obtained.

Finally, polybutadienes containing hydroxyl groups and polybutadienes containing acid anhydride groups are known and may be reacted by mixing, acidic or basic catalysts optionally being added to accelerate the reaction. However, it was not known that mixtures such as these can be formulated to adhesives which, after pregelation, can be cured by vulcanization.

SUMMARY OF THE INVENTION

It is an object of the present invention to provide a two-component adhesive system which cures by two different chemical reaction mechanisms that can be activated successively and catalyzed at least substantially independently of one another. The adhesive system was to show high application tolerances, particularly in regard to the mixing ratio between the two components. In addition, the gelation rate was to be variable. Finally, the cured adhesive was to satisfy the requirements typically imposed in the automotive industry in regard to hydrolysis and ageing stability and also thermal stability.

Accordingly, the present invention provides a pregellable adhesive comprising: (a) from about 30 to about 70 parts by weight of a polymer A containing on average at least two hydroxyl groups per macromolecule; (b) from about 70 to about 30 parts by weight of a polymer B compatible with A and containing on average at least two carboxylic acid and/or carboxylic anhydride groups or at least one carboxylic acid and one carboxylic anhydride group per molecule; (c) from about 10 to about 120 parts by weight of a vulcanization promoter; wherein at least one of said polymers A or B contains vulcanizable carbon-carbon double bonds.

The present invention also relates to a process for the formation of an adhesive bond between vulcanization-stable substrates, characterized in that a polymer A, which contains esterification catalysts and/or oxidation inhibitors in solution or admixture, is thoroughly mixed with a polymer B, which contains vulcanizing agents and, optionally, fillers and/or promoters in solution and/or admixture, to form a rubber mixture, the rubber mixture thus formed is applied to the substrates to be bonded, the substrates are fitted together, the bond is precured at or just above room temperature, but always below the vulcanization temperature, and is then brought to the vulcanization temperature, optionally after temporary storage, and cured.

DESCRIPTION OF THE PREFERRED EMBODIMENTS

In its broadest embodiment, the invention relates to the concept of using as an adhesive a two-component system which pregels when the two components are mixed and which may then be finally cured by a second curing mechanism. A preferred mechanism for the second curing mechanism is vulcanization. Possible chemical reactions for pregelation, i.e. the first curing mechanism, are reactions which can lead, for example, to the formation of ester groups, more especially the esterification of carboxylic anhydride groups containing polymer-bound hydroxyl groups, the esterification of carboxylic acids or even transesterification reactions.

Accordingly, the polymers A and B present in the system on the one hand must bear chemical groups which react during pregelation; on the other hand, however, at least one of components A and B must also bear chemical groups which react during curing, i.e. for example during vulcanization.

Thus, polymer A contains on average at least two hydroxyl groups per macromolecule. However, more than two hydroxyl groups may even be present, particularly with relatively high degrees of polymerization. The hydroxyl groups may be arranged at the ends of the chain or at the ends of side groups, although they may also lie directly on the chain. Polymer A may contain vulcanizable double bonds and must contain vulcanizable double bonds when polymer B contains no such vulcanizable double bonds. Similarly, polymer B may contain vulcanizable double bonds and must contain vulcanizable double bonds when polymer A contains no such double bonds. Polymer B contains on average two carboxylic acid and/or carboxylic anhydride groups per molecule or one or more carboxylic acid groups and one or more carboxylic anhydride groups per molecule. In the preparation of the polymer mixtures, the expert must always ensure than polymers A and B are compatible with one another, i.e. the polymers must not separate.

Preferred materials for polymers A and B are liquid polyolefins containing the corresponding terminal groups, particularly liquid polydienes, for example liquid polybutadienes. However, it is also possible to use copolymers based on butadiene and olefins or copolymers based on isoprene which may optionally contain other monomers, for example copolymers of butadiene and olefins. Among such compounds, those containing halogen are less preferred.

Where little importance is attributed to hydrolysis stability, compatible polyesters and/or polyamides containing the corresponding terminal groups may also be used as polymer A or polymer B.

In one preferred embodiment of the invention, polymer A is a polybutadiene containing terminal or internal hydroxyl groups while polymer B is a polybutadiene containing carboxylic anhydride groups. Preferred polybutadienes have a molecular weight Mn (as determined by vapor pressure osmometry) in the range from 1,000 to 3,500 and preferably in the range from 1,500 to 2,000. Suitable products have acid numbers in the range from 50 to 200 and preferably in the range from 70 to 160 (as polymer B). The hydroxyl values of polymer A are preferably in the range from 25 to 75.

In one preferred embodiment of the invention, polymers containing carboxylic anhydride groups are used as polymer B. Calculation of the molar ratios of polymer A to polymer B is based on the assumption that one carboxylic anhydride group is consumed per hydroxyl group.

If a component containing only carboxyl groups, i.e. no carboxylic anhydride groups, is used as polymer B, a ratio of hydroxyl to carboxyl groups of from 0.5:1 to 2:1 is preferred. If a component containing carboxylic anhydride groups is used as polymer B, the ratio of hydroxyl groups to carboxylic anhydride groups may be varied from 0.5:1 to 2:1. In both bases, a ratio of 0.7:1 to 1.5:1 is preferred.

To catalyze the pregelation reaction, the rubber mixtures according to the invention contain esterification catalysts. Basic esterification catalysts are preferred, although, if no metals are to be bonded, acidic esterification catalysts may also be used if desired providing they are compatible with the vulcanization systems. Preferred basic esterification catalysts are amines, particularly secondary and tertiary aliphatic amines, such as for example n-dibutylamine, dimethyl cyclohexylamine, dimethylamine, diethylamine, triethylamine, tri-n-propylamine and/or N-alkylmorpholines, more particularly the methyl, ethyl or propyl compound. The basic esterification catalysts are used in quantities of from 0.1 to 5% by weight, based on polymers A and B, depending on reactivity and the desired pregelation time.

The rubber mixtures according to the invention contain the vulcanization promoters, catalysts and accelerators known to the expert, i.e. for example mixtures of sulfur and mercaptobenzodiazole disulfite, optionally in admixture with active fillers, such as for example active zinc oxide and the like, as the vulcanization system in the quantities normally used for vulcanization.

In addition, the rubber mixtures according to the invention may also contain fillers such as, for example, calcium carbonate, carbon black, pyrogenic silica, talcum and the like. The fillers are used in quantities of from 20 to 80% by weight, based on polymers A and B.

In addition, compounds such as, for example, oxidation inhibitors and/or pigments may also be present. The oxidation inhibitors used are the oxidation inhibitors typically used for the rubber components on which the mixture is based, including for example such compounds as tetrakis-(methylene-3,5-di-tert.-butyl-4-hydroxyhydrocinnamate)-methane. They are used in quantities of from 0.1 to 3% by weight, based on polymers A and B.

To prepare the rubber mixture according to the invention, it has been found to be appropriate to add the esterification catalysts and, optionally, the oxidation inhibitors to polymer A, i.e. the polymer containing hydroxyl groups. It has also been found to be appropriate to add the vulcanization system and, optionally, other promoters to polymer B. On the other hand, it is also entirely possible to incorporate the vulcanization system in polymer A only or half-and-half in both polymers. The content of vulcanization system amounts to between 8 and more than 20 parts by weight to 200 parts by weight polymer mixture. The vulcanization temperatures are in the range from 160° to 220° C. and the vulcanization times between a few minutes and more than 1 hour. Fillers in particular may be added to both polymers. The polymers A and B mixed with the components mentioned must be stored separately pending application (two-component system).

After mixing in a suitable ratio, the rubber mixtures are applied to the substrates to be bonded. The pregelation esterification reaction begins after mixing and may be controlled in terms of time through the esterification catalyst, for example the amine used.

Within a few minutes, the rubber mixtures according to the invention acquire a strength which enables freshly bonded car parts to withstand the mechanical stressing involved in the cleaning of bodywork before painting.

After or during the pregelation reaction, the rubber mixtures according to the invention are brought to the vulcanization temperature at which they are cured under standard vulcanization conditions.

In addition to their favorable bonding properties, a particular advantage of the products according to the invention lies in the fact that the various curing reactions can be effectively controlled and in the fact that no solvents are used.

The following examples are meant to illustrate but not limit the invention.

EXAMPLES

Several rubber mixtures were prepared. A hydroxyl-containing polybutadiene (PBH) having the following properties was used as polymer A: molecular weight (vapor pressure osmometry) approx. 3,000, viscosity at 20° C. approx. 350 dPa·s, density approx. 0.94 g/cm$^3$, hydroxyl value approx. 48 mg KOH/g.

Two different polybutadienes containing carboxylic anhydride groups were used as polymer B.

Properties of PBA1: molecular weight (vapor pressure osmometry) 1,700, viscosity 2,200 dPa·s at 20° C., density approx. 0.97, acid number 150 mg KOH/g.

Polybutadiene PBA2: molecular weight approx. 1,700, viscosity 54 dPa·s at 20° C., density 0.94, acid number approx. 70 mg KOH/g.

Tetrakis-(methylene-3,5-di-tert.-butyl-4-hydroxyhydrocinnamate)-methane was used as oxidation inhibitor. Active zinc oxide was used as filler and carbon black as pigment, the vulcanizing agent was a mixture based on sulfur/mercapbenzothiazole disulfite. Finally, di-n-butylamine was used as catalyst. To prepare the particular component A, the solids were weighed in, the polybutadiene was added and the pregelation catalyst subsequently introduced. Mixing was carried out in a Z kneader. To prepare the particular components B, the vulcanizing agent was introduced into the polybutadiene and the resulting mixture added to the other solid constituents.

Example 1

| A | | B | |
|---|---|---|---|
| PBH | 43.9 | PBA$_1$ | 43.5 |
| Oxidation inhibitor | 1.5 | Oxidation inhibitor | 1.0 |
| Fillers | 54.6 | Fillers | 55.5 |

Example 2

| A | | B | |
|---|---|---|---|
| PBH | 39.1 | PBA$_1$ | 43.5 |
| Oxidation inhibitor | 1.0 | Oxidation inhibitor | 1.0 |
| Fillers | 49.6 | Fillers | 55.5 |
| Vulcanizing agent | 10.3 | | |

Example 3

| A | | B | |
|---|---|---|---|
| PBH | 37.6 | PBA$_1$ | 43.6 |
| Oxidation inhibitor | 0.9 | Oxidation inhibitor | 1.0 |
| Fillers | 46.4 | Fillers | 55.4 |
| Pigment | 4.3 | | |
| Vulcanizing agent | 10.8 | | |

Example 4

| A | | B | |
|---|---|---|---|
| PBH | 39.4 | PBA$_2$ | 42.7 |
| Oxidation inhibitor | 1.1 | Oxidation inhibitor | 1.9 |
| Fillers | 49.1 | Fillers | 54.7 |
| Pigment | 0.7 | Pigment | 0.7 |
| Vulcanizing agent | 9.7 | | |

Example 5

| A | | B | |
|---|---|---|---|
| PBH | 38.5 | PBA$_2$ | 38.4 |
| Oxidation inhibitor | 1.0 | Oxidation inhibitor | 1.0 |
| Fillers | 48.6 | Fillers | 48.5 |
| Pigment | 1.0 | Pigment | 2.4 |
| Vulcanizing agent | 10.9 | Vulcanizing agent | 9.7 |

Example 6

| A | | B | |
|---|---|---|---|
| PBH | 41.0 | PBA$_2$ | 40.8 |
| Oxidation inhibitor | 1.0 | Oxidation inhibitor | 1.3 |
| Fillers | 51.5 | Fillers | 51.8 |
| Pigment | 1.2 | Pigment | 0.9 |
| Vulcanizing agent | 5.3 | Vulcanizing agent | 5.2 |

Example 7

| A | | B | |
|---|---|---|---|
| PBH | 35.0 | PBA$_2$ | 43.7 |
| Oxidation inhibitor | 0.9 | Oxidation inhibitor | 1.5 |
| Fillers | 46.3 | Fillers | 54.0 |
| Pigment | 0.6 | Pigment | 0.8 |
| Vulcanizing agent | 17.2 | | |

Example 8

| A | | B | |
|---|---|---|---|
| PBH | 39.3 | PBA$_2$ | 39.3 |
| Oxidation inhibitor | 1.0 | Oxidation inhibitor | 1.1 |
| Fillers | 49.2 | Fillers | 49.1 |
| Pigment | 0.7 | Pigment | 0.7 |
| Vulcanizing agent | 9.8 | Vulcanizing agent | 9.8 |

Example 9

| A | | B | |
|---|---|---|---|
| PBH | 39.0 | PBA$_2$ | 39.3 |
| Oxidation inhibitor | 1.0 | Oxidation inhibitor | 1.0 |
| Fillers | 48.2 | Fillers | 49.3 |
| Pigment | 0.7 | Pigment | 0.7 |
| Catalyst | 1.7 | Vulcanizing agent | 9.7 |
| Vulcanizing agent | 9.7 | | |

Example 10

| A | | B | |
|---|---|---|---|
| PBH | 39.0 | PBA$_2$ | 39.3 |
| Oxidation inhibitor | 1.0 | Oxidation inhibitor | 1.0 |
| Fillers | 48.8 | Fillers | 49.1 |
| Pigment | 0.7 | Pigment | 0.7 |
| Catalyst | 0.8 | Vulcanizing agent | 9.9 |
| Vulcanizing agent | 9.7 | | |

Example 11

| A | | B | |
|---|---|---|---|
| PBH | 39.3 | PBA$_2$ | 39.3 |
| Oxidation inhibitor | 1.0 | Oxidation inhibitor | 1.0 |
| Fillers | 49.0 | Fillers | 49.1 |
| Pigment | 0.7 | Pigment | 0.7 |
| Vulcanizing agent | 10.0 | Vulcanizing agent | 9.9 |

Example 12

| A | | B | |
|---|---|---|---|
| PBH | 43.2 | PBA$_2$ | 35.9 |
| Oxidation inhibitor | 1.0 | Oxidation inhibitor | 1.0 |
| Fillers | 54.2 | Fillers | 44.8 |
| Pigment | 0.8 | Pigment | 0.6 |
| Catalyst | 0.8 | Vulcanizing agent | 17.8 |

Example 13

| A | | B | |
|---|---|---|---|
| PBH | 42.2 | PBA$_2$ | 53.2 |
| Oxidation inhibitor | 1.0 | Oxidation inhibitor | 0.6 |
| Fillers | 52.7 | Fillers | 31.6 |
| Pigment | 0.8 | Pigment | 0.4 |
| Catalyst | 0.9 | Silica | 1.8 |
| Silica | 2.4 | Vulcanizing agent | 12.4 |

Example 14

| A | | B | |
|---|---|---|---|
| PBH | 43.9 | PBA$_2$ | 43.9 |
| Oxidation inhibitor | 1.0 | Oxidation inhibitor | 0.5 |
| Fillers | 51.1 | Fillers | 28.8 |
| Pigment | 0.8 | Pigment | 0.4 |
| Catalyst | 0.7 | Silica | 5.8 |
| Silica | 2.4 | Vulcanizing agent | 20.6 |

PBH: polybutadiene containing hydroxyl groups
PBA: polybutadiene containing, anhydride groups
All quantities in parts by weight.

Ad Example 1

Mixtures A and B of Example 1, which do not contain a vulcanizing agent, were blended with one another and different quantities of di-n-butylamine were added as pregelation catalyst. The setting time as a function of the quantity of catalyst was visually determined with the following results:

| % Catalyst/Mixture A + B | Setting time |
|---|---|
| 1.6 | 2 minutes |
| 1.3 | 4 minutes |
| 0.8 | 7 minutes |
| 0.4 | 24 minutes |
| 0 | several days |

Ad Example 2

Components A+B of Example 2 were mixed to form a rubber mixture according to the invention which was then used to bond 2 mm thick sealing materials to ZES steel plates. Curing took place for 25 minutes at 170° C. The tensile shear strength measured 16 daN/cm$^2$. The failure pattern was adhesive failure and cohesive failure in the sealing material.

Ad Example 3

The rubber mixtures according to the formulation of Example 3 were used to bond sealing material to ZES steel plates or steel plates galvanized on one side. The mixtures were cured on the one hand for 25 minutes at 170° C. and, on the other hand, for 1 hour at 200° C. The tensile shear strengths of the bond were determined after storage for one day at room temperature and after humid storage for 7 days at 70° C. The following results were obtained.

| SUBSTRATE 1 (curing) | TENSILE SHEAR STRENGTH after 1 d/RT (daN/cm$^2$) | TENSILE SHEAR STRENGTH after 7 d/70° C. (daN/cm$^2$) | CHANGE |
|---|---|---|---|
| ZES steel plates (25 mins./170° C.) | 16.8 | 17.2 | +2% |
| ZES steel plates (1 h at 200° C.) | 21.0 | 21.5 | +2.4% |
| Steel plates galvanized on one side (25 mins./170° C.) | 17.6 | 20.5 | +16.5% |

Example 4

The following results were obtained with the mixtures according to Example 4.

| Substrate (curing) | Tensile shear strength (daN/cm$^2$) | Tensile shear strength after ageing (daN/cm$^2$) |
|---|---|---|
| ZES 25 mins. at 170° C. | 10.7 | 12.3 |
| ZES 1 h at 200° C. | 18.9 | 15.0 |
| Galvanized on one side 25 mins. at 170° C. | 9.7 | 12.6 |
| Galvanized on one side 1 h at 200° C. | 14.2 | 16.0 |

The effect of a variation in the addition of the vulcanizing agent to parts A and B was then investigated using the mixtures of Examples 4 to 8 and 12 and 13. The following results were obtained.

| | | Example 4 | | | Example 5 | | | Example 6 | | | Example 7 | | |
|---|---|---|---|---|---|---|---|---|---|---|---|---|---|
| % Vulcanizing agent | A | 9.7 | | | 10.9 | | | 5.3 | | | 17.2 | | |
| | B | 0 | | | 9.7 | | | 5.2 | | | 0 | | |
| | | H$_0$ | H$_7$ | | H$_0$ | H$_7$ | | H$_0$ | H$_7$ | | H$_0$ | H$_7$ | |
| ZES 25 mins./170° C. | | 10.7 | 12.3 | +15% | 22.4 | 20.3 | −9.4% | 12.4 | 15.6 | +25.8% | 23.3 | 19.7 | −15.5% |
| ZES 1 h/200° C. | | 18.9 | 15.0 | −20.6% | 22.6 | 26.7 | +18.1% | 19.0 | 18.3 | −3.7% | 28.5 | 29.0 | +1.8% |

-continued

| | | | | | | | | | | |
|---|---|---|---|---|---|---|---|---|---|---|
| G1 25 mins./170° C. | 9.7 | 12.6 | +30% | / | / | / | / | / | / | / |
| G1 1 h/200° C. | 14.2 | 16.0 | +12.7 | / | / | / | / | / | / | / |

| | | Example 8 | | | Example 12 | | | Example 13 | | |
|---|---|---|---|---|---|---|---|---|---|---|
| % Vulcanizing agent | A | 9.8 | | | 0 | | | 0 | | |
| | B | 9.8 | | | 17.8 | | | 12.4 | | |
| | | $H_0$ | $H_7$ | | $H_0$ | $H_7$ | | $H_0$ | $H_7$ | |
| ZES 25 mins./170° C. | | 19.7 | 17.2 | −12.7% | 21.3 | 22.7 | +6.6% | 18.7 | 20.7 | +10.7% |
| ZES 1 h/200° C. | | 24.3 | 19.8 | −18.5% | / | / | | 22.6 | 22.7 | +0.4% |
| G1 25 mins./170° C. | | 21.2 | 20.0 | −5.7% | / | / | | / | / | |
| G1 1 h/200° C. | | 22.1 | 20.4 | −7.7% | / | / | | / | / | |

Key:
Tensile shear strengths (daN/cm$^2$)
ZES: ZES steel plates (thickness 0.8 mm)
G1: steel plates galvanized on one side
$H_0$: measured after 1 day at room temperature
$H_7$: measured after humid storage at 70° C.

The results show that vulcanizing agent and catalyst may generally be added to polymer A or polymer B or to both. In the interests of stability in storage, it has proved to be favorable to add component A to the catalyst, but the vulcanizing agent to component B.

Ad Example 8

Using the mixture of Example 8, the humid storage test at 70° C. was extended to 21 days to determine ageing behavior. The following results were obtained:

| Substrate (curing) | Before ageing (daN/cm$^2$) | After 7 days' humid storage at 70° C. (daN/cm$^2$) | After 14 days' humid storage at 70° C. (daN/cm$^2$) | After 21 days' humid storage at 70° C. (daN/cm$^2$) |
|---|---|---|---|---|
| ZES (25 mins./170° C.) | 19.7 | 17.2 | 17.0 | 20.3 |
| ZES (1 h/200° C.) | 24.3 | 19.8 | 20.9 | 24.8 |
| Galvanized on one side (25 mins./170°) | 21.2 | 20.0 | 19.0 | 20.0 |
| Galvanized on one side (1 h/200° C.) | 22.1 | 20.4 | 23.0 | 22.0 |

Ad Examples 9 and 10

The tolerance of the adhesive system to changes in stoichiometry was demonstrated using the mixtures of components A and B of Example 9. To this end, the mixtures were mixed with one another in different ratios. Bonds were then prepared on ZES plates and cured for 25 minutes at 170° C., followed by humid storage (7 days at 70° C./25% air humidity). The following results were obtained.

| % A | % B | Tensile shear strength before ageing (daN/cm²) | Tensile shear strength after 7 days' humid storage (daN/cm2) |
|---|---|---|---|
| 11.5 | 88.5 | 12.0 | 13.0 |
| 43.8 | 56.2 | 18.7 | 18.4 |
| 47.4 | 52.6 | 18.0 | 16.2 |
| 55.9 | 44.1 | 17.6 | 20.0 |
| 84.3 | 15.7 | 17.1 | 15.3 |

Cohesive failures or cohesive/adhesive failures

Similar results were obtained with the mixtures of Example 10.

Ad Example 11

The effect of various amines on the setting time of the pregel was investigated using the mixtures of Example 11. The following results were obtained.

| Catalyst | Setting time |
|---|---|
| Dimethyl cyclohexylamine | 20 minutes |
| n-Dibutylamine | 25 minutes |
| Tri-n-propylamine | 45 minutes |
| Catalyst | Setting time |
| Triethylamine | 1 hour |
| Methyl-N-morpholine | 2 hours |
| Dimethylamine | 1 day |

Ad Example 14

The tests according to Example 9 were repeated with the mixtures of Example 14. In addition, the setting times were measured. The results show that the setting time may be controlled within limits through the stoichiometry of the components polymer A and polymer B.

What is claimed is:

1. A process for applying adhesives to vehicles during their construction comprising the steps of
   I) forming a liquid or spreadable vulcanizable rubber mixture based on more than one polymer of which at least one polymer is olefinically unsaturated, wherein said mixture comprises
      (a) from about 30 to about 70 parts by weight of a polymer A containing on average at least two hydroxyl groups per macromolecule;
      (b) from about 70 to about 30 parts by weight of a polymer B compatible with A and containing on average at least two carboxylic acid and/or carboxylic anhydride groups or at least one carboxylic acid and one carboxylic anhydride group per molecule;
      (c) from about 10 to about 120 parts by weight of vulcanization auxiliary components; and, optionally,
      (d) from about 0.1 to about 5 parts by weight of an esterification catalyst, wherein at least one of polymers A and B is vulcanizable under vulcanization conditions at an elevated temperature through its olefinic double bonds, and wherein one of polymers A and B is derived from a vulcanizable polydiene and the other polymer is a compatible polyamide, polyester, or a copolymer containing OH and/or carboxylic acid or carboxylic anhydride groups, or wherein both polymers A and B are derived from polydienes or copolymers thereof;
   II) applying the rubber mixture formed in step I) to at least one of two metal vehicle substrates to be bonded together;
   III) placing the vehicle substrates together to form an adhesive bond;
   IV) precuring the adhesive bond at a temperature below the vulcanization temperature of the rubber mixture by means of an esterification reaction to obtain a bond strength that enables the freshly bonded metal vehicle substrates to withstand the mechanical stressing involved in pretreatment of the substrates before painting;
   V) pretreating the metal vehicle substrates wherein the precured adhesive bond is not significantly adversely affected by the pretreating process or processes; and
   VI) subsequently bringing the pretreated bonded substrates to a temperature wherein vulcanization of said adhesive bond takes place.

2. The process of claim 1 wherein step IV) is carried out at about room temperature.

3. The process of claim 1 wherein step VI) is carried out at a temperature of at least about 170° C.

4. The process of claim 1 wherein in said rubber mixture both polymers A and B are olefinically unsaturated.

5. The process of claim 1 wherein in said rubber mixture both polymers A and B are derived from polybutadiene.

6. The process of claim 5 wherein polymer A is an OH-terminated polybutadiene, and polymer B is a polybutadiene terminated by carboxylic acid and/or carboxylic anhydride groups.

7. The process of claim 6 wherein the stoichiometric ratio of hydroxyl groups to carboxyl and/or carboxylic anhydride groups is from about 0.5:1 to about 2:1.

8. The process of claim 1 wherein in said rubber mixture polymer B has an acid value of from about 50 to about 200.

9. The process of claim 8 wherein said acid value is from about 70 to about 180.

10. The process of claim 1 wherein in said rubber mixture component (d) is a basic catalyst.

11. The process of claim 1 wherein in said rubber mixture component (c) is a sulfur compound and/or a vulcanization catalyst.

12. The process of claim 1 wherein said rubber mixture contains from about 10 to about 80% by weight of zinc oxide, calcium carbonate, and/or silica, based on the weight of polymers A plus B.

13. The process of claim 1 wherein the precured adhesive bond is not materially affected by hydrolysis, ageing, mechanical or thermal stress.

14. The process of claim 1 wherein after step V the bonded substrates are painted, and step VI is carried out to both vulcanize the adhesive bond and cure the paint.

15. The process of claim 1 wherein in step V at least one pretreating process comprises cleaning the bonded substrates.

* * * * *